United States Patent
Bush et al.

(10) Patent No.: US 7,724,888 B1
(45) Date of Patent: May 25, 2010

(54) AUTOMATED METHOD FOR DETERMINING CALLER SATISFACTION

(75) Inventors: Ryan J. Bush, Belmont, CA (US); Bertrand A. Damiba, San Francisco, CA (US); Anthony Rajakumar, Foster City, CA (US)

(73) Assignee: Bevocal LLC, Sunnyvale, CA (US)

( * ) Notice: Subject to any disclaimer, the term of this patent is extended or adjusted under 35 U.S.C. 154(b) by 1350 days.

(21) Appl. No.: 11/167,449

(22) Filed: Jun. 27, 2005

Related U.S. Application Data

(60) Provisional application No. 60/663,287, filed on Mar. 18, 2005.

(51) Int. Cl.
*H04M 7/00* (2006.01)
*H04M 3/00* (2006.01)
*H04M 5/00* (2006.01)
*H04M 1/64* (2006.01)

(52) U.S. Cl. .................. 379/221.01; 379/88.01; 379/88.09; 379/223; 379/265.01; 379/273

(58) Field of Classification Search ............ 379/221.01, 379/88.01, 223, 273, 265.01, 265.02, 212.01, 379/211.02, 88.09
See application file for complete search history.

(56) References Cited

U.S. PATENT DOCUMENTS

| 6,584,180 | B2 * | 6/2003 | Nemoto | 379/88.01 |
| 2001/0010714 | A1 * | 8/2001 | Nemoto | 379/88.01 |

* cited by examiner

*Primary Examiner*—Thjuan K Addy
(74) *Attorney, Agent, or Firm*—Tina Lessani; Lessani & Lessani LLP

(57) ABSTRACT

An automated method for determining user satisfaction with a call comprising (1) maintaining a count of the number of times a user was asked for input during the call (the "actual count"), (2) maintaining a count of the number of times a user should have been asked for input based on the dialog path the user traversed (the "ideal count"), and (3) associating no difference between the actual count and the ideal count with maximum user satisfaction and associating increasing differences between the counts with decreasing user satisfaction. In one embodiment, if the difference between the actual count and ideal count reaches a certain threshold, the call system changes the interaction with the user.

31 Claims, 5 Drawing Sheets

AUTOMATED METHOD FOR DETERMINING CALLER SATISFACTION

RELATED APPLICATIONS

This application claims the benefit of U.S. Provisional Application No. 60/663,287, filed on Mar. 18, 2005, and titled "Automated Method for Determining Caller Satisfaction," the contents of which are incorporated by reference as if fully disclosed herein.

BACKGROUND OF THE INVENTION

1. Field of the Invention

This invention relates generally to automated calling systems (such as IVR systems), and, more particularly, to an automated method for determining caller satisfaction with a call.

2. Description of Background Art

Organizations increasingly employ automated systems, such as interactive voice response (IVR) systems to handle calls. Such systems automate communications with callers (or callees, in the case of outbound calling applications; hereafter, 'user' is used for both callers and callees) and perform actions in response to user input.

User satisfaction depends on how easily a user is able to progress through the desired call path(s). Users tend to get frustrated when the call does not progress as desired. For instance, in IVR systems where the user is asked for speech input, a user's frustration would likely increase if the system did not accurately understand the speech input.

Known methods for determining user satisfaction with a call include having a human listen to live calls or recorded calls. This is very expensive, time consuming, and usually not practical for systems that experience a large volume of calls.

Therefore, it is desirable to have an automated method to determine user satisfaction with a call in order to (1) enable the system to take corrective action during a call in the event of less-than-desired user satisfaction or (2) let system administrators, based on user satisfaction, identify any problem areas, or compare the caller satisfaction experienced by users of one version of call-processing/voice recognition software with caller satisfaction experienced by users of another version.

SUMMARY

The present invention provides an automated method for determining user satisfaction with a call. The method comprises (1) maintaining a count of the number of times a user was asked for input during the call (the "actual count"), (2) maintaining a count of the number of times a user should have been asked for input based on the dialog path the user traversed (the "ideal count"), and (3) associating no difference between the actual count and the ideal count with maximum user satisfaction and associating increasing differences between the counts with decreasing user satisfaction.

In one embodiment, if the difference between the actual count and ideal count reaches a certain threshold, the call system changes the interaction with the user. Examples of the ways in which the interaction can be changed include changing the dialog path, changing the grammar used for speech recognition, changing prompts played to the user (whether pre-recorded or using text-to-speech), and routing the user to a live human agent.

DETAILED DESCRIPTION OF THE PREFERRED EMBODIMENTS

The present invention provides an automated method for determining user satisfaction with a call where the user is asked for input during the call. The call can either be an automated call or a call with a live human agent. The user could be asked either to speak words (e.g., "state your first name") or to press touch-tone phone buttons (e.g. "press 1 for account information"). The call can be either an inbound call, where a user calls the system, or an outbound call, where the system calls the user. The method of the present invention may be particularly useful in identifying problems or success with respect to automated calls where the user is asked for speech input. This is because recognizing speech in automated calls can be difficult.

Figure 1:
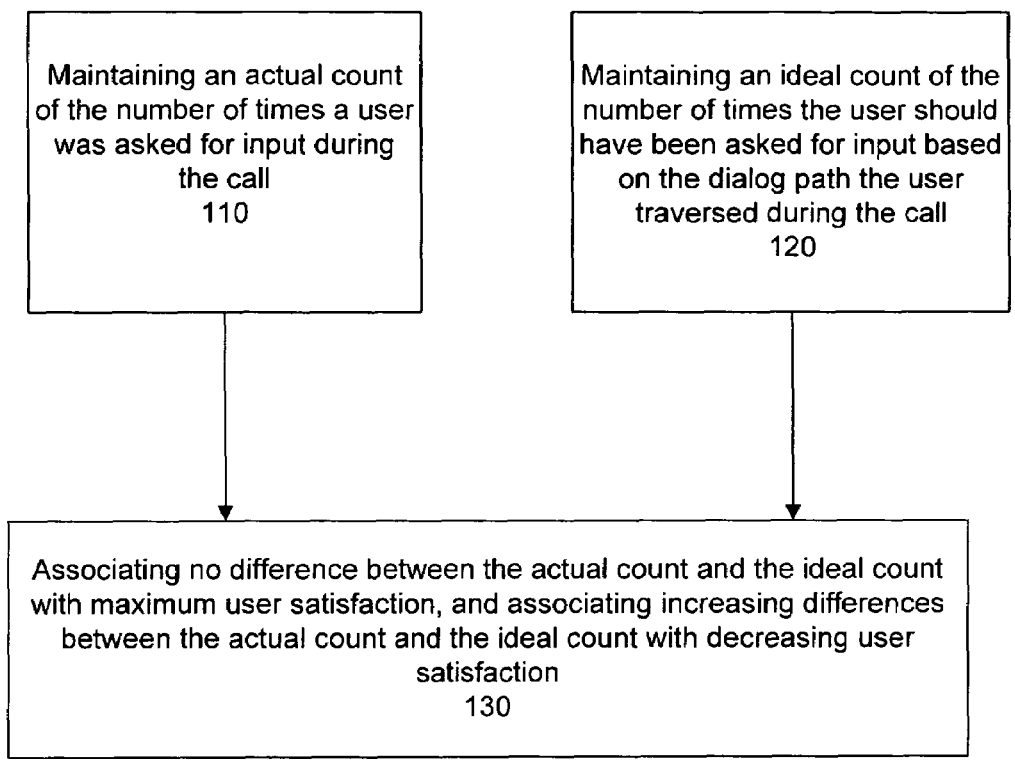
FIG. 1 illustrates an automated method for determining user satisfaction with a call.

As illustrated in FIG. 1, the method comprises (1) maintaining 110 an actual count of the number of times a user was asked for input during the call, (2) maintaining 120 an ideal count of the number of times a user should have been asked for input based on the dialog path the user traversed, and (3) associating 130 no difference between the actual count and the ideal count with maximum user satisfaction and associating increasing differences between the counts with decreasing user satisfaction. The differences (if any) between the actual count and ideal count allows for visibility into the users' qualitative experience, which can be used to (i) rank or sort calls, (ii) compare calls, (iii) identify problematic calls, (iv) determine the overall success of the call system, and (v) compare the difference in effectiveness between different call systems (or different versions of a call system). The foregoing uses are just examples and are not meant to be an exhaustive list of the possible uses.

Figure 2:
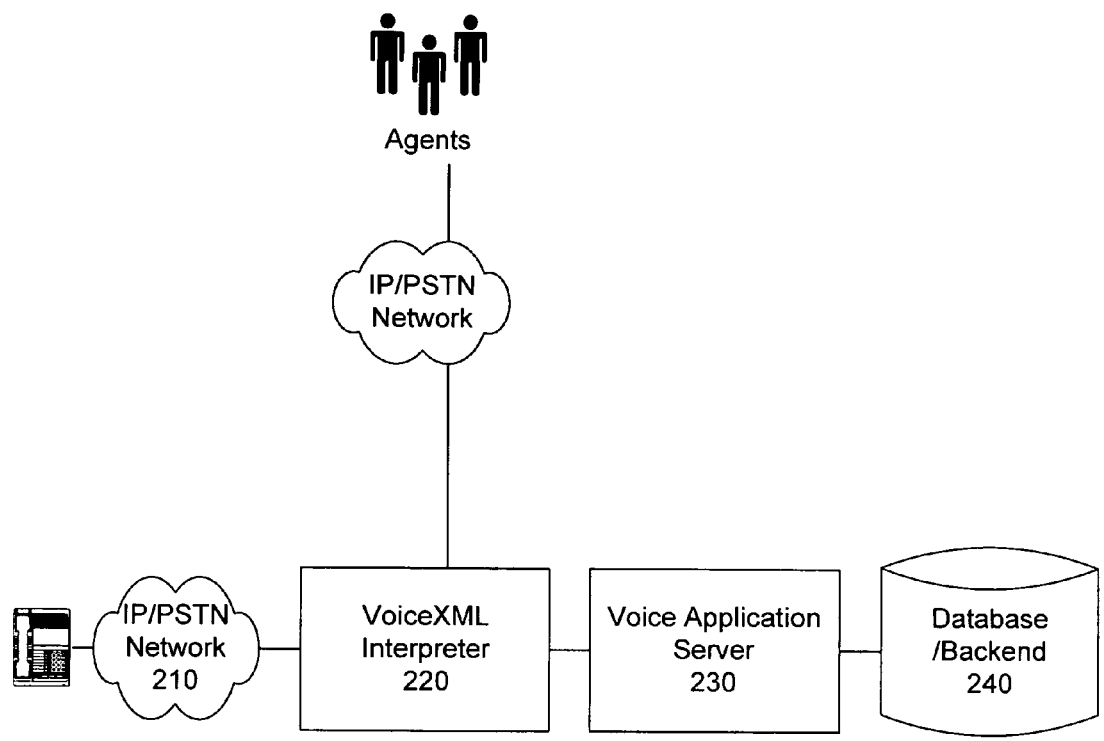
FIG. 2 illustrates an example of a call system in which the method of the present invention may be implemented.

In one embodiment, the foregoing method is implemented by software in a call system (such as an interactive voice response (IVR) system). FIG. 2 illustrates an example of a system in which the method can be implemented, although the invention is not limited to this system. In this example, a user communicates with the call system via an Internet Protocol (IP) network or the Public Switched Telephone Network (PSTN) 210. A VoiceXML Interpreter 220 in the call system plays automated voice messages to the user and recognizes speech input from the user. In one embodiment, the VoiceXML Interpreter is software that downloads a VoiceXML document from the Voice Application Server 230 and executes the dialog included in such VoiceXML document, where, in such embodiment, the dialog in the Voice XML document also encompasses the method of the present invention.

The VoiceXML Interpreter 220 recognizes user input and takes any action required as a result of such input, as directed to by the applicable downloaded VoiceXML document. For instance, the VoiceXML Interpreter 220 might have the recognized input stored in the backend database 240, or it might use the recognized input to have information retrieved from the database 240, where it then may provide such information to the user in form of automated speech. The VoiceXML Interpreter 230, at the direction of the downloaded VoiceXML document, also may route the user to a live agent via the Public Switched Telephone Network (PSTN) or an IP network.

Figure 3:
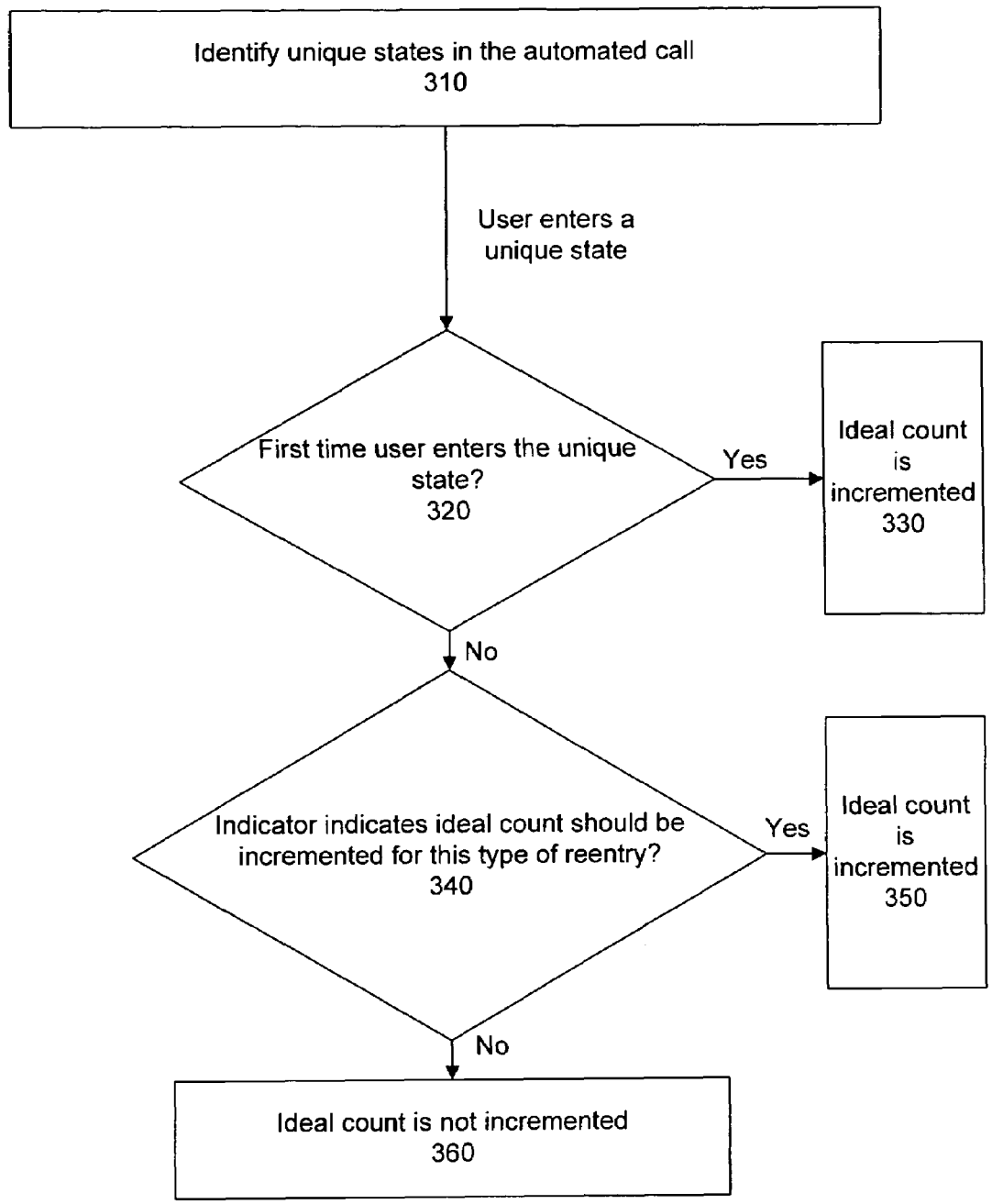
FIG. 3 illustrates a method, according to one embodiment of the present invention, for calculating the ideal count.

FIG. 3 illustrates one way in which a call system implementing the method depicted in FIG. 1 calculates the ideal count. The "dialog path" of a call is the complete sequence of all dialog states traversed in that call. In one embodiment, unique states for all the dialog path options are predefined (step 310) by the developer of the call system (such as call system 200 in FIG. 2). When a user enters a unique state during the call, the call system determines 320 whether this is the first time the user has entered the unique state. If so, it increments 330 the ideal count by one. If this is not the first time the user has entered the state (i.e., it is a re-entry), the call system determines 340 whether there is a flag or another indicator associated with such re-entry that indicates that the count should be incremented for this type of re-entry into the state. (Note: a user staying in the same state after the state has been executed may be considered a type of re-entry into the same state). Such flag or other indicator can be preset by the developer or administrator of the call system, where such developer/administrator sets the flag/indicator to reflect whether or not a re-entry into a particular state is likely to be a successful progression of the call or whether the re-entry reflects the fact that the user is somehow stuck or not progressing as desired. For instance, in an automated call system that provides users with stock quotes, a re-entry into a state where a user can request another stock quote would be considered a successful progression of the call, and, thus the flag or other indicator associated with such re-entry would indicate that the ideal count should be incremented. On the other hand, if the user re-enters a state in a call because the system failed to recognize the user's speech input (or the user does not validate a recognition result of voice input), this would not be a successful progression of the call, and, thus, the flag or other indicator associated with such re-entry would indicate that the ideal count should not be incremented.

If the flag or other indicator associated with the re-entry indicates the ideal count should be incremented, the ideal count is incremented 350. If the flag or other indicator associated with such re-entry indicates the ideal count should not be incremented, the count is not incremented 360.

The call system may maintain just one actual count and one ideal count per call. Alternately, the call system may track an actual count and ideal count for each unique state, where, to obtain the actual count and the ideal count for the entire call, the call system sums the actual and ideal counts of all the unique states traversed during the call (such summing can happen at the end of the call or a running sum can be maintained during the call). Tracking an actual count and an ideal count for each unique state enables the call system or a system administrator to identify if there are any problems in a particular state.

Figure 4:
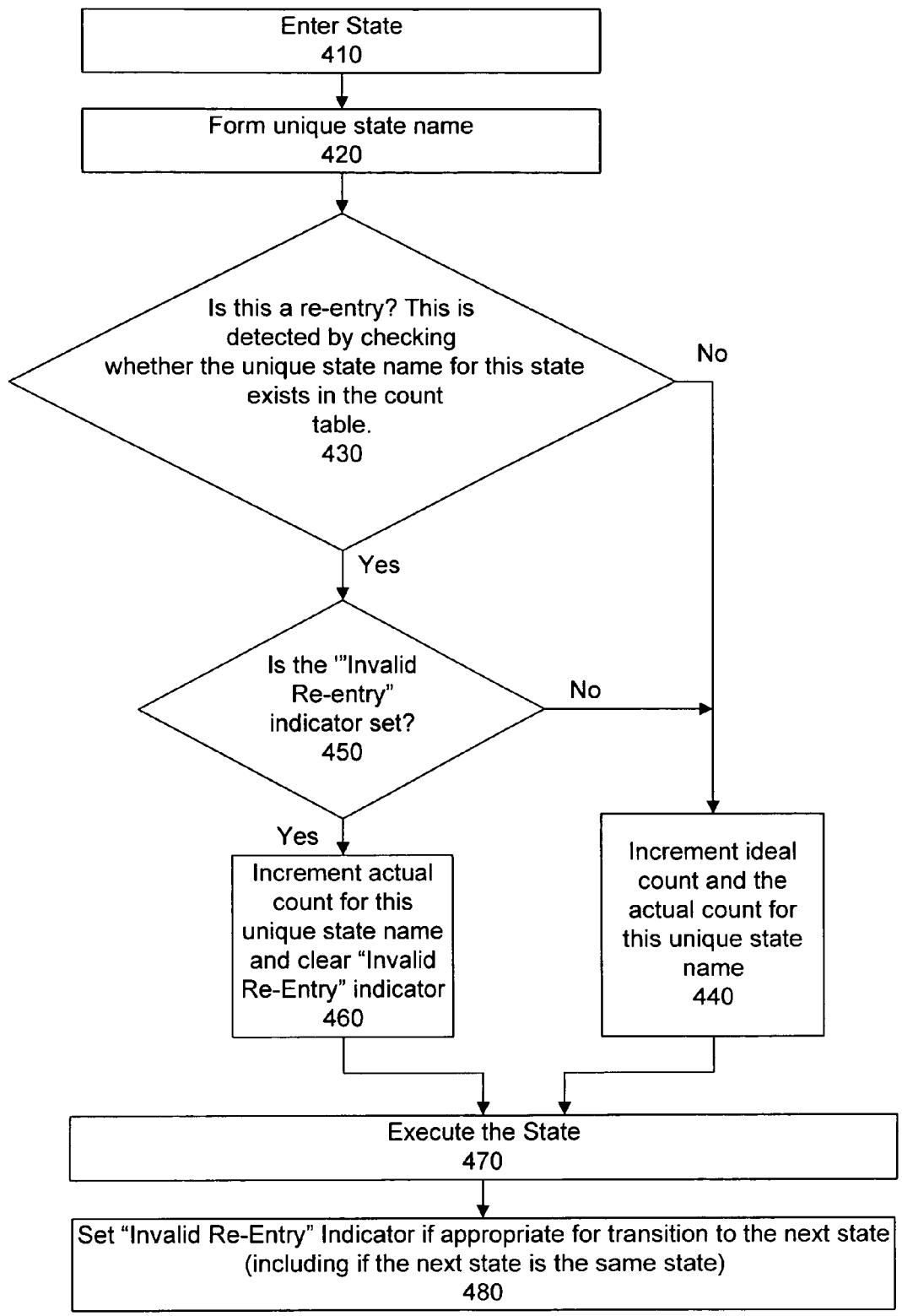
FIG. 4 illustrates an example implementation of the method of FIG. 3.

FIG. 4 illustrates an example of an implementation of the method described with respect to FIG. 3. When a user enters 410 a unique state in a call, the call system forms 420 a unique state name for such state. A unique state name is necessary to distinguish a given state from all other states in the application that may share the same basic name (in VoiceXML, the basic name is equivalent to the name of a form). A unique state name may be derived by several methods. One such method in VoiceXML is to combine the state's basic name (i.e., the name of the form) to the URL of the page (i.e., the downloaded VoiceXML document) that contains the state. Since all URLs within the application server are guaranteed to be unique, this combination then will also be unique.

Returning to FIG. 4, the call system determines 430 whether the user is re-entering the state by checking whether the unique state name for this state exists in a count table maintained by the call system for the present call. The count table is a table maintained by the call system that lists the unique states a user has entered during the call. If the unique state name does not exist in the count table, the call system increments 440 the ideal count and actual count for that unique state. As stated above, the system can maintain (1) an ideal count and actual count for each unique state, (2) just one running ideal count and one running actual count for the whole call, or (3) both actual/ideal counts for each state and cumulative actual/ideal counts for the whole call.

If the unique state name already exists in the count table (meaning the user has re-entered the state), the call system determines whether an "Invalid Re-Entry" flag is set 450 (note: "Invalid Re-Entry" is just the name of the flag provided herein for convenience and this flag could be called anything; also a flag is just an example of one type of indicator which may be used). Such flag indicates whether or not the re-entry is considered a successful progression of the call, and, in this example, would be set if the re-entry into the state is not considered a successful progression of the call. If the Invalid Re-Entry flag is not set, the call system increments 440 both the ideal count and actual count. If such flag is set, the call system increments the actual account (but not the ideal count) and clears the Invalid-Reentry flag 460. The state is then executed 470.

The call system then sets 480 the Invalid Re-Entry flag if appropriate for the transition to the next state. In this example, the flag is set if transition from the current state to the next state (including when the current state and the next state are the same state) would not be part of a successful progression of the call, such as when a user stays in a state because the call system failed to understand the user's input. In one embodiment, the logic of whether or not a re-entry justifies setting the Invalid Re-Entry flag is built into the software code of the call system by the system developer (i.e., the system developer determines whether or not a transition is likely to be a successful progression of the call). Those skilled in the art will appreciate that instead of having a flag that is set when the ideal count should not be incremented, the system could instead use a flag that is set when the ideal count should be incremented.

Figure 5:
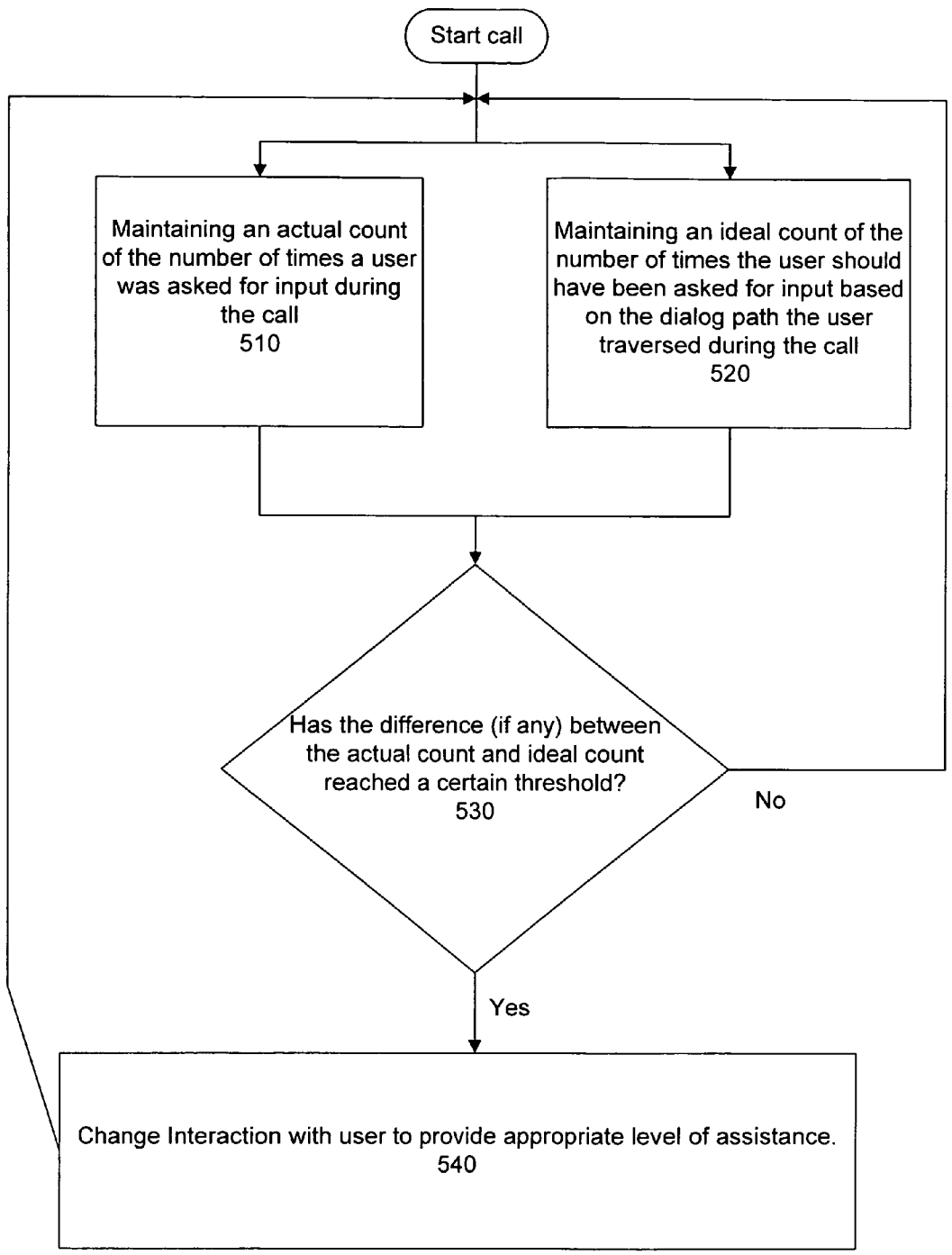
FIG. 5 illustrates a further embodiment of the present invention.

FIG. 5 illustrates a further (or alternate) embodiment of the invention. As described with respect to FIG. 1, the call system maintains 510, 520 an actual count of the number of times a user has asked for input, as well as an ideal count of the number of times a user should have been asked for input based on the dialog path the user traversed. The call system then determines 530 whether the difference between the actual count and the ideal count reaches a certain threshold. If the difference reaches such certain threshold, the call system changes 540 the interaction with the user to provide the appropriate level of assistance. Otherwise, the interaction stays the same. In either case, the call system continues to maintain the actual count of number of times a user is asked for input based on the dialog path (step 510), and the ideal count of the number of times the user should have been asked for input based on the dialog path the user traversed (step 520). Ways in which the call system may change the interaction with the user include (but are not limited to) transferring the user to a live agent, changing the voice-recognition grammar, changing the dialog path, and/or changing prompts (whether pre-recorded or using text-to-speech) used to prompt the user for information.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. An automated method for determining user satisfaction with a call comprising:
   maintaining an actual count of the number of times a user was asked for input during the call;
   maintaining an ideal count of the number of times the user should have been asked for input during the call based on the dialog path the user traversed during the call; and
   associating no difference between the actual count and the ideal count with maximum user satisfaction, and associating increasing differences between the actual count and the ideal count with decreasing user satisfaction.

2. The method of claim 1 further comprising calculating the relative proportion between the actual count and the ideal count to determine the difference between the counts.

3. The method of claim 1 further comprising subtracting the ideal count from the actual count to determine the difference between the counts.

4. The method of claim 1 further comprising subtracting the actual count from the ideal count to determine the difference between the counts.

5. The method of claim 1, wherein the input is voice input.

6. The method of claim 1, wherein the method is implemented by an automated voice recognition system.

7. The method of claim 1, wherein the dialog path is a series of states and wherein maintaining the ideal count comprises:
   each time the user enters a state for the first time during the call, incrementing the ideal count; and
   each time the user reenters a state during the call, incrementing the ideal count only if an indicator associated with such reentry indicates the ideal count should be incremented.

8. The method of claim 7 wherein an indicator associated with reentry indicates the ideal count should be incremented if the reentry is predetermined to be a successful progression of the call.

9. The method of claim 6 wherein an indicator associated with the reentry indicates the ideal count should not be incremented if the reentry is predetermined not to be a successful progression of the call.

10. The method of claim 7 wherein the indicator associated with the reentry indicates the ideal count should not be incremented if the reentry is for the purpose of requesting that the user repeat an attempt to enter input for a state.

11. The method of claim 7 wherein the indicator associated with the reentry indicates the ideal count should not be incremented if the reentry is for the purpose of requesting that the user reenter voice input due to failure to recognize previously-entered voice input for the state.

12. The method of claim 7, wherein the indicator associated with the reentry indicates that the ideal count should not be incremented if the reentry is due to failure to receive requested input from the user.

13. The method of claim 7, wherein the indicator associated with the reentry indicates that the ideal count should not be incremented if the reentry is due to the user not validating a recognition result of voice input.

14. The method of claim 6, wherein in response to the difference between the ideal count and the actual count exceeding a predetermined limit threshold during the call, initiating action to assist the user with the call.

15. The method of claim 14, wherein initiating action to assist the user with the call includes transferring the call to a live agent.

16. The method of claim 1, wherein in response to the difference between the ideal count and the actual count reaching a predetermined threshold during the call, changing the interaction with the user to provide the appropriate level of assistance to the user.

17. The method of claim 16, wherein changing the interaction includes changing prerecorded prompts used to prompt the user for information.

18. The method of claim 16, wherein changing the interaction includes changing the grammar against which user voice input is recognized.

19. The method of claim 16, wherein changing the interaction includes changing the dialog path.

20. The method of claim 1, further comprising calculating the difference between the actual count and the ideal count for multiple calls, and using the differences to sort or rank calls.

21. The method of claim 20, further comprising using the difference to identify problematic calls.

22. The method of claim 1, further comprising calculating the difference between the actual count and the ideal count for multiple calls and comparing calls based on calculations of such differences.

23. An automated method in an interactive voice response system for determining user satisfaction with a call comprising:
   maintaining an actual count of the number of times a user was asked for input during the call;
   maintaining an ideal count of the number of times the user should have been asked for input during the call based on the dialog path the user traversed during the call;
   determining whether the difference between the actual count and the ideal count reaches a certain threshold; and
   in response to the difference reaching the certain threshold, changing the interaction with the user to provide the appropriate level of assistance to the user.

24. The method of claim 22, wherein changing the interaction includes changing prerecorded prompts used to prompt the user for information.

25. The method of claim 22, wherein changing the interaction includes changing the grammar against which user voice input is recognized.

26. The method of claim 22, wherein changing the interaction includes changing the dialog path.

27. The method of claim 1, wherein the dialog path is a series of states and wherein maintaining an ideal count and an actual count comprises maintaining an ideal count and actual count for each unique state in the dialog path.

28. The method of claim 27, wherein the ideal count for the call is the sum of the ideal counts for each of the unique states in the dialog path and wherein the actual count for the call is the sum of the actual counts for each of the unique states in the dialog path.

29. An automated method in an interactive voice response system for determining user satisfaction with a call, wherein the call comprises a series of states, comprising:
   maintaining an actual count of the number of times a user was asked for input during a state;

maintaining an ideal count of the number of times the user should have been asked for input during such state;

determining whether the difference between the actual count and the ideal count reaches a certain threshold; and in response to the difference reaching the certain threshold, changing the interaction with the user to provide the appropriate level of assistance to the user.

30. The method of claim 29, wherein changing the interaction includes changing prerecorded prompts used to prompt the user for information.

31. The method of claim 29, wherein changing the interaction includes changing the grammar against which user voice input is recognized.

* * * * *